(12) United States Patent
Schwarz et al.

(10) Patent No.: US 10,199,830 B2
(45) Date of Patent: Feb. 5, 2019

(54) METHOD AND A SYSTEM FOR CONTROLLING ENERGY SUPPLY TO DIFFERENT UNITS

(71) Applicant: NEC EUROPE LTD., Heidelberg (DE)

(72) Inventors: Maja Schwarz, Heidelberg (DE); Anett Schuelke, Gaiberg (DE); Mischa Schmidt, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/327,038

(22) PCT Filed: Mar. 6, 2015

(86) PCT No.: PCT/EP2015/054717
§ 371 (c)(1),
(2) Date: Jan. 18, 2017

(87) PCT Pub. No.: WO2016/141952
PCT Pub. Date: Sep. 15, 2016

(65) Prior Publication Data
US 2017/0163039 A1  Jun. 8, 2017

(51) Int. Cl.
*H02J 3/00* (2006.01)
*H02J 3/38* (2006.01)
(Continued)

(52) U.S. Cl.
CPC ........ *H02J 3/381* (2013.01); *G06Q 10/06375* (2013.01); *G06Q 30/0202* (2013.01);
(Continued)

(58) Field of Classification Search
CPC .......... G06Q 10/06375; H02J 2003/003; H02J 3/008
(Continued)

(56) References Cited

U.S. PATENT DOCUMENTS 6,122,603 A     9/2000   Budike, Jr.
9,236,737 B1 *  1/2016   Moan ........................ H02J 3/00
(Continued)

FOREIGN PATENT DOCUMENTS

JP    2007028720 A      2/2007
JP    2014084584 A  *   5/2014
(Continued)

OTHER PUBLICATIONS

Sheikhi Aras et al: "A cloud computing framework on demand side management game in smart energy hubs", International Journal of Electrical Power & Energy Systems, Jordan Hill, Oxford, GB, vol. 64, Sep. 20, 2014 (Sep. 20, 2014), pp. 1007-1016, XP029081043.

*Primary Examiner* — Adi Amrany
(74) *Attorney, Agent, or Firm* — Leydig, Voit & Mayer, Ltd.

(57) ABSTRACT

A method for controlling energy supply to different units includes receiving, by an aggregator, the demand request signal, and performing, by the aggregator, an allocation of the requested demand modification to the units based on a negotiating process with the units for minimizing an impact of the allocation on a future operation of another utility or of other utilities. Each unit is connected to multiple utilities for receiving enemy for operating its energy systems. A demand request signal is provided by at least one operational entity and/or by at least one utility for requesting a demand modification of a utility and/or of one form of energy.

14 Claims, 4 Drawing Sheets

(51) Int. Cl.
*G06Q 50/06* (2012.01)
*H02J 3/14* (2006.01)
*H02J 13/00* (2006.01)
*G06Q 10/06* (2012.01)
*G06Q 30/02* (2012.01)

(52) U.S. Cl.
CPC ............... *G06Q 50/06* (2013.01); *H02J 3/14* (2013.01); *H02J 13/0013* (2013.01); *H02J 2003/003* (2013.01); *H02J 2003/007* (2013.01); *Y02B 70/3225* (2013.01); *Y02B 90/2607* (2013.01); *Y02E 60/76* (2013.01); *Y04S 10/54* (2013.01); *Y04S 20/222* (2013.01); *Y04S 40/12* (2013.01); *Y04S 40/22* (2013.01); *Y04S 50/14* (2013.01)

(58) Field of Classification Search
USPC .......................................................... 307/31
See application file for complete search history.

(56) References Cited

U.S. PATENT DOCUMENTS

| | | | |
|---|---|---|---|
| 9,789,779 B2* | 10/2017 | Shimizu | B60L 11/1824 |
| 2011/0090042 A1* | 4/2011 | Leonard | G05B 15/02 340/5.1 |
| 2011/0178977 A1* | 7/2011 | Drees | G05B 15/02 706/52 |
| 2011/0231320 A1* | 9/2011 | Irving | G06Q 30/00 705/80 |
| 2012/0259749 A1 | 10/2012 | Park et al. | |
| 2012/0331476 A1* | 12/2012 | Saffre | G06F 9/5038 718/104 |
| 2013/0007498 A1 | 1/2013 | Acosta-Cazaubon et al. | |
| 2013/0085614 A1* | 4/2013 | Wenzel | F24F 11/006 700/277 |
| 2014/0062195 A1* | 3/2014 | Bruschi | B60L 11/1842 307/38 |
| 2015/0213466 A1* | 7/2015 | Mirzazad Barijough | G06Q 10/00 705/7.35 |
| 2015/0345812 A1* | 12/2015 | Murthy | F24F 11/001 700/276 |
| 2015/0346741 A1* | 12/2015 | Murthy | G05B 15/02 700/276 |
| 2016/0225006 A1* | 8/2016 | Chen | G06Q 30/0224 |
| 2017/0061553 A1* | 3/2017 | Chen | G06Q 50/06 |

FOREIGN PATENT DOCUMENTS

| | | |
|---|---|---|
| WO | WO 2011074925 A2 | 6/2011 |
| WO | WO 2013084268 A1 | 6/2013 |

* cited by examiner

METHOD AND A SYSTEM FOR CONTROLLING ENERGY SUPPLY TO DIFFERENT UNITS

CROSS REFERENCE TO RELATED APPLICATIONS

This application is a U.S. National Stage Application under 35 U.S.C. § 371 of International Application No. PCT/EP2015/054717 filed on Mar. 6, 2015. The International Application was published in English on Sep. 15, 2016 as WO 2016/141952 A1 under PCT Article 21 (2).

FIELD

The present invention relates to a method for controlling energy supply to different units, wherein each unit is connected to multiple utilities for receiving energy for operating its energy systems and wherein a demand request signal is provided by at least one operational entity and/or by at least one utility for requesting a demand modification of a utility and/or of one form of energy. Further, the present invention relates to a corresponding system for controlling energy supply to different units.

BACKGROUND

Methods and systems for controlling energy supply to different units, wherein each unit is connected to multiple utilities for receiving energy for operating its energy systems are known from prior art. Within such methods and systems a demand request signal is provided by at least one operational entity and/or by at least one utility for requesting a demand modification of a utility and/or of one form of energy. In this document, the terms utility and energy network are used interchangeably. A form of energy is electricity, gas or heat, for example.

Due to ongoing changes in energy systems that are driven by high penetration of renewable energy sources (RES) and other types of distributed energy resources (DER), many utility providers or utilities offer demand response (DR) programs as one possible means for energy management. Units in the form of end-users participating in a DR program agree to change their consumption compared to their normal usage in situations when resources are scarce because of low supply or high demand. The type of reward that a user decreasing its load will get from the utility provider is economical with details specified in DR contract.

Open automated demand response (OpenADR) is a standard developed to manage energy consumption via communication model designed for sending and receiving DR signals from utility providers to electric customers. It also specifies how third parties will interface to a Demand Response Automation Server (DRAS), that is used to facilitate the automation of customer response to various DR programs through communicating units.

DR programs are normally related to provision of electrical energy. However, not only electrical utilities need to request a temporal change in consumption. For instance, it can happen that a district heating utility cannot serve the entire demand, especially if its supply depends on uncontrollable RES. Thus, systems that consider DR for multiple utilities are emerging (see WO 2011/074925 A2 and U.S. Pat. No. 6,122,603).

WO 2011/074925 A2 shows participation of customers with multiple DR programs for different utilities. A prediction of customer's future demand per utility is based on CBL, Customer Baseline Load, calculation per utility. The customer's utility demand is predicted by establishing CBL.

U.S. Pat. No. 6,122,603 shows a multi-utility energy control system for monitoring consumption, cost of resource generation, plurality of utility types with a single master meter and for monitoring and controlling individual utility systems within a facility for determining possible utility cost adjustments to enhance cost effectiveness. The consumption rates are monitored and compared to theoretical and/or historical data to identify unexpected changes in consumption and to identify peak demands, surges and sags. Further, a software is disclosed for controlling utility consuming systems by adjusting actual utility consumption in response to predetermined parameters.

For use within the following disclosure of this document the term "cost function" is defined as follows: In mathematical optimization, statistics, decision theory and machine learning, a loss function or cost function is a function that maps an event or values of one or more variables onto a real number intuitively representing some "cost" associated with the event. An optimization problem seeks to minimize a loss function. An objective function is either a loss function or its negative (sometimes called a reward function or a utility function), in which case it is to be maximized. In statistics, typically a loss function is used for parameter estimation, and the event in question is some function of the difference between estimated and true values for an instance of data (see Wikipedia http://en.wikipedia.org/). Note: costs can be real monetary costs, but also violations to performance KPIs.

SUMMARY

In an embodiment, the present invention provides a method for controlling energy supply to different units, wherein each unit is connected to multiple utilities for receiving energy for operating its energy systems and wherein a demand request signal is provided by at least one operational entity and/or by at least one utility for requesting a demand modification of a utility and/or of one form of energy. The method includes receiving, by an aggregator, the demand request signal, and performing, by the aggregator, an allocation of the requested demand modification to the units based on a negotiating process with the units for minimizing an impact of the allocation on a future operation of another utility or of other utilities.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
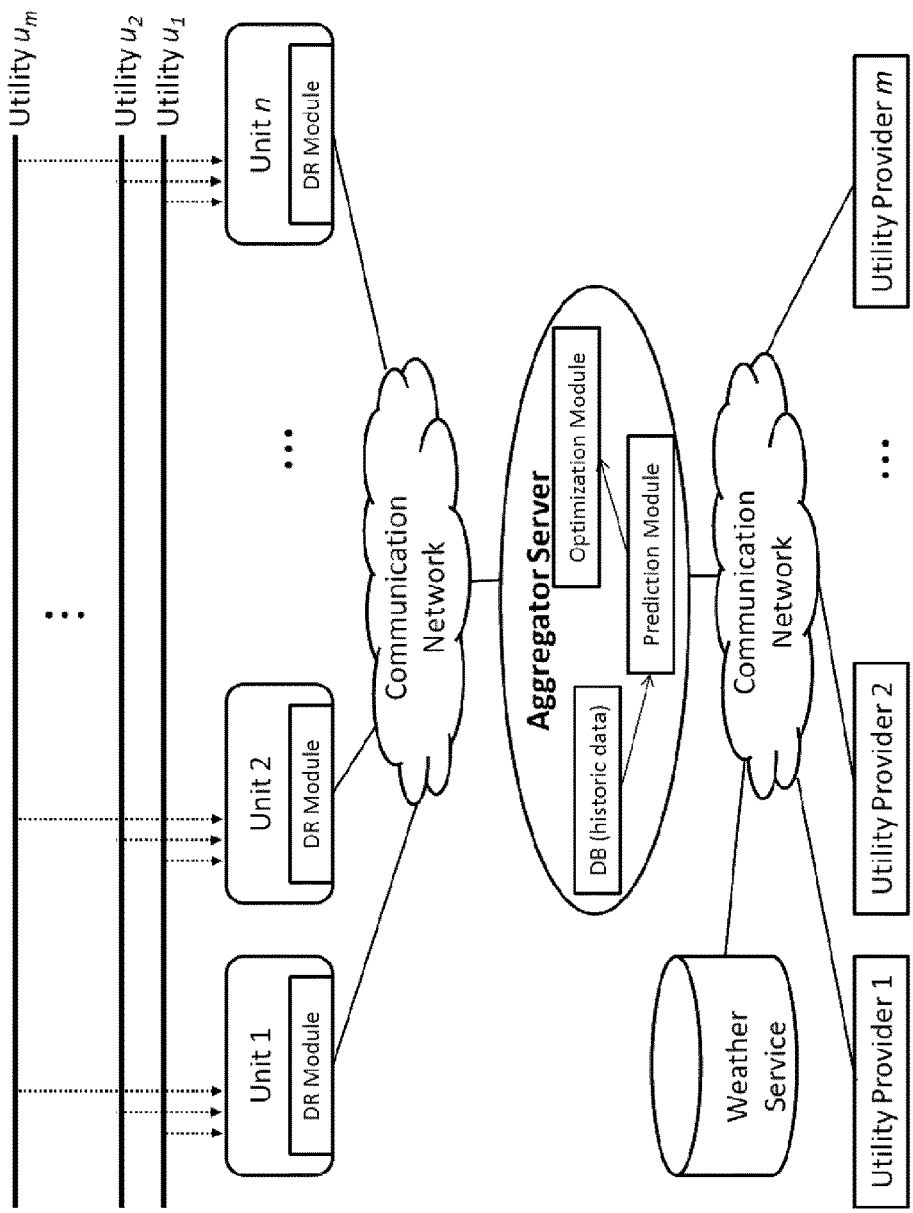
FIG. 1 shows schematically an embodiment of a system for controlling energy supply to different units with a DR request distribution according to an embodiment of the invention.

A method and a system for controlling energy supply to different units for allowing a reliable energy supply with high efficiency are described herein.

According to an embodiment of the present invention, a method is characterized in that an aggregator receives the demand request signal and performs an allocation of the requested demand modification to the units based on a negotiating process with the units for minimizing an impact of said allocation on a future operation of another utility or of other utilities.

According to an embodiment of the present invention, a system is characterized by an aggregator for receiving the demand request signal and performing an allocation of the requested demand modification to the units based on a negotiating process with the units for minimizing an impact of said allocation on a future operation of another utility or of other utilities.

According to an embodiment of the invention, it is possible to allow a very reliable and effective energy supply by using or providing an aggregator which receives the demand request signal and performs an allocation of the requested demand modification to the units. Such an allocation is based on a negotiating process with the units for minimizing an impact of said allocation on a future operation of another utility or of other utilities. Thus, the negotiating process considers the impact of the allocation on other utilities for providing a balanced performance of involved utilities under consideration of dependencies between said utilities. This is an important feature, since utilities are not completely independent. For instance, reducing the amount of electricity used for heating of a large building or sport complex would affect the load of the district heating utility and the other way around. An impact of current modifications in consumption of one utility on other utilities can be considered by this method. As a result, a reliable energy supply with high efficiency can be realized using resources of utilities in an optimized way.

Within a preferred embodiment the allocation can be performed dynamically. Such a dynamic allocation provides a very quick reaction to varying boundary conditions of the utilities and/or environmental context parameters for providing a very sensitive and efficient allocation of the requested demand modification. Such an allocation can be performed after definable time periods. Preferably, the allocation can be performed in real-time in a continuous way or triggered by monitored changes of boundary conditions and/or environmental context parameters, for example a change of weather conditions.

Within a further preferred embodiment the negotiating process can consider a prediction and/or a probability of one or more possible future demand modification requests of said utility and/or another utility or of other utilities. Under consideration of such a prediction an allocation can for example consider that a specific utility will not be able to provide a sufficient amount of energy within a predicted future time period. Thus, selecting said specific utility for a supplementary energy supply would not be appropriate within this future time period for reliable and efficient energy supply. However, not only the prediction of one or more possible future demand modification requests of a utility is important, but also the probability for such a possible future demand modification request. The consideration of such a probability will further result in a reliable and effective energy supply to the units.

The prediction and/or probability can depend on different boundary conditions and/or environmental parameters. Preferably, the prediction and/or probability can depend on weather, time, season and/or activity of a utility, unit or energy system of a unit.

Within a further preferred embodiment the impact on a future operation of another utility or of other utilities can comprise the impact on one or more possible and/or probable future demand modification requests of said other utility or utilities. In other words, the allocation can be performed under consideration of the impact on one or more possible and/or probable future demand modification requests of said other utility or utilities. In this way future possible and/or probable demand modification requests can be considered within the allocation.

For providing a very efficient allocation the negotiating process can consider feedback information from at least one unit and/or historical data and/or weather forecast. By such a negotiating process different boundary conditions and environmental parameters can be considered.

Preferably the feedback information from a unit can comprise an estimation of a maximal possible modification, i.e. reduction or increase, of the utility over a requested time period. Thus, the aggregator can use different individual information from different individual units regarding the maximal possible modification range of units with regard to the utility over a requested time period.

Further preferred, the feedback information from a unit can comprise an estimation of how a maximal possible modification, i.e. reduction or increase, of the utility over a requested time period would affect loads of other utilities that the unit is connected to. This information will help in providing a very efficient allocation of the requested demand modification with minimal impact on other utilities.

Within a preferred embodiment the historical data can comprise prior allocation processes per unit including amount and/or timeline and/or duration of allocated demand modification. Such historical data can help in providing a reliable prediction of energy supply within future situations.

Alternatively or additionally the negotiating process can consider a preferably learned correlation between different utilities for at least one defined unit or for each unit, preferably in size or amount of allocated demand modification and/or of timely responsiveness. Such correlations will provide a realistic prediction of future situations.

Within the negotiating process individual boundary conditions of the units can be considered. Preferably, the negotiating process can consider an operation-specific priority level and/or a Key Performance Indicator (KPI) requirement on a comfort level and/or scheduled operational conditions, preferably for activities or events regarding the units.

For providing a very reliable energy supply the aggregator can inform the units about allocated modifications. Such allocated modifications are the result of a negotiating process with the units.

Within a preferred embodiment the aggregator can directly control the energy systems of the units according to the allocated demand modification. Different ways for effecting the allocated demand modification are possible. Various communication systems can be used for the control of the energy systems of the units.

The units can be realized by various entities. Within a preferred embodiment at least one unit can be a building. Multiple units can provide a building campus.

The demand request signal can be provided by at least one utility. However, within a further preferred embodiment the demand request signal can be provided by at least one operational entity. Such an operational entity can be an energy planning entity or one of the units. Thus, a unit can initiate an allocation by providing a demand request signal, if, for example, a rearrangement within the unit has been performed. This could be an addition of a further energy system to the unit or an addition of a further room to a building, for example.

Embodiments of the present invention can comprise a dynamic distribution method and system for multi-utility energy control aggregator between multiple independently operating energy management units, where energy modification requests can be retrieved from external utility systems and/or from connected unit's internal energy management systems, where aforementioned energy modification requests are communicated between an aggregator and the connected operating units, whereby the unit negotiates the modification tolerance per utility, and provides information of the applicable control systems or energy systems, and where the individual units authorize the aggregator actuation enforcement for appropriate control systems or energy systems, and where the aggregator executes the control system or energy system actuations upon the optimized distribution model, respecting (1) learned correlations between different utilities for each unit and the connected unit group in variables like size, amount, timely responsiveness, (2) history of modification adaptation of each unit (e.g. responsiveness and/or capacities in size, timeline, serving level, and duration), (3) operation-specific priority levels (e.g. KPI requirements based on comfort levels, scheduled operational conditions, e.g. activities/events), and (4) prediction of upcoming modification requests of same or different utility to unit group (e.g. dependent on flexible context like weather, time, season, activities), including the steps of prediction of the performance of the system with optional upcoming control signals, and calculation of optimized distribution scheme between multiple autonomously operated units.

Preferred embodiments of a method and a system for multi-utility DR request distribution to a group of units include the following steps: (1) reception of a DR signal that requests a reduction for a given utility; (2) communication to the units in order to enquire maximal possible reductions or increases and the resulting effects on other utilities; (3) prediction of future DR reduction/increase requests and their probabilities; (4) optimization-based allocation of the current reduction or increase amount to the units so that the impact on highly probable future requests is minimized; (5) informing the units about their assigned reduction/increase amounts; and (6) enforcing utility actuation through the units' utility control systems.

Embodiments of the present invention can manage simultaneously DR signals for multiple utilities in a multi-site environment maximizing the request fulfillment rate and minimizing side effects on other utilities. This is achieved by consideration of future highly probable requests in the process of request distribution.

Embodiments of this invention propose a system and a method for energy control management over multiple cooperating units deploying demand reduction/increase control through a demand response request distribution that considers prediction of possible future DR requests and the impact of current modifications in consumption of one utility on other utilities. The distribution of demand response requests is considered between members of a group of units that participate in a demand response program(s) and carry the opportunity to serve more than one utility program simultaneously such as electricity, heating via hot water, gas, water. In order to achieve high request fulfillment rate, the method considers high probabilities for a proximate modification request when negotiating and allocating DR requests to the units.

Though the aggregators and multi-utility systems have been investigated so far, it has not been solved how to minimize the impact of a load modification requested for one utility on future requests for other utilities. This is an important question, since utilities are not completely independent. For instance, reducing the amount of electricity used for heating of a large building or sport complex would affect the load of the district heating utility and the other way around. Within embodiments of this invention, it is aimed a maximization of request fulfillment rate of an aggregator that distributes DR signals for multiple utilities by consideration of the effects of the current assignment on the possible future DR signals.

Within embodiments of this invention, the term "negotiation" preferably applies to an exchange of information through communication protocols and their mechanisms defined in the state of the art, e.g. OpenADR, by which the aggregator and the units can come to an agreement to which extent and during which period units can fulfill energy modification request. Negotiations can consist of one or more communication exchange rounds. In the broadest sense, an aggregator instructing units to reduce energy by a certain amount in a specific period of time is also considered a negotiation.

FIG. 1 shows schematically a system for controlling energy supply to different units according to an embodiment of the invention. FIG. 1 depicts a system for a multi-utility energy control management function hosted via an aggregator to serve energy modification requests—e.g. via DR signals, via campus-internal scheduling units—distributed under a set of independent energy control units flexible in multiple—correlated—energy dimensions. The modification requests are coming to the aggregator for m different utilities via a communication network, preferably Internet. End-customers—here units—have network connections to the mentioned utilities. The aggregator decides how to allocate the requested amount of reduction/increase based on feedback received from the units, historic data and additional information such as weather forecast. The main goal of the energy control management function at the aggregator is to fulfill the received modification request at high rate realizing a dynamic distribution scheme between multiple units respecting (1) history of modification adaptation of the units, e.g. size, timeline, serving level, (2) prediction of upcoming modification requests of same or different utility to unit group (preferably dependent on weather, time, season), (3) learning of unit-specific multi-utility correlation in size and amount, and (4) operation-specific priority levels, e.g. KPI requirements on comfort levels.

Figure 2:
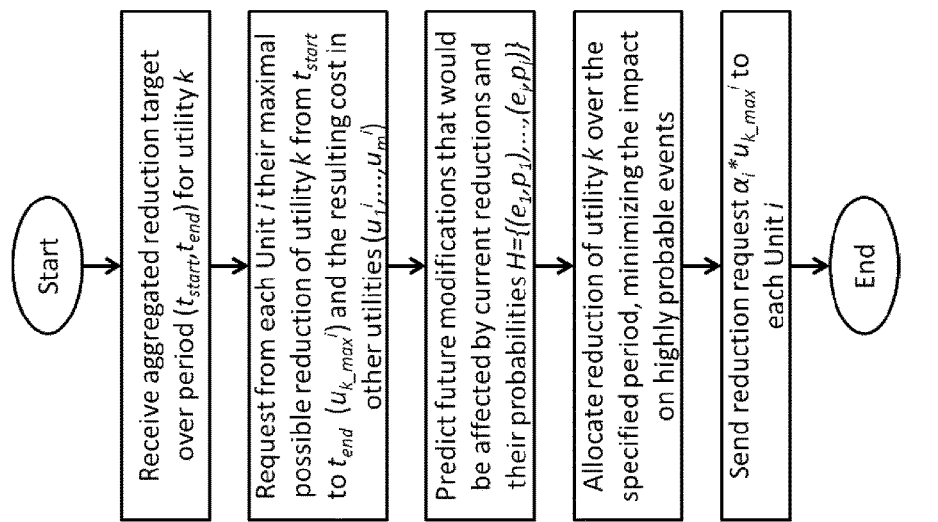
FIG. 2 shows a diagram explaining an embodiment of a method according to an embodiment of the invention for modification request distribution.

We propose to predict coming energy modification requests while distributing a requested reduction/increase amount of an utility and try to minimize the effect of the current modification assignments on the utilities that might need a change in near future. The main idea of the proposed method is given in FIG. 2.

In the following text, it is explained an example of the invention involving only consumption modification requests realized by DR signals which are of main interest in the current girds. Other sources for the modification requests can be an energy planning entity, for example, e.g. on a campus energy network.

The aggregator receives a DR request that specifies the utility k and the period over which the utility k should be reduced, together with the desired reduction amount. Upon this DR signal, the aggregator requests from each unit an estimation of the maximal possible reduction of the utility k over the specified period and an estimation of how this reduction would affect loads of other utilities that the unit is connected to. This feedback is provided by DR modules that can model how a decrease in one utility affects other utilities. The aggregator also predicts future DR that can happen over a time period relevant to the current request, as well as the probabilities of these events. This is done based on historic data and weather forecasts. Having all this data ready, in the next step the aggregator assigns reductions in the utility k to the units, trying to minimize their effect on the utilities that are highly probable to be the subject of near-future—reduction—requests who in turn would be translated by this invention into corresponding control commands to be enacted. In the last step, the aggregator informs the units about reductions that are requested from them and control enforcement of the units' utility control systems is executed.

Figure 4:
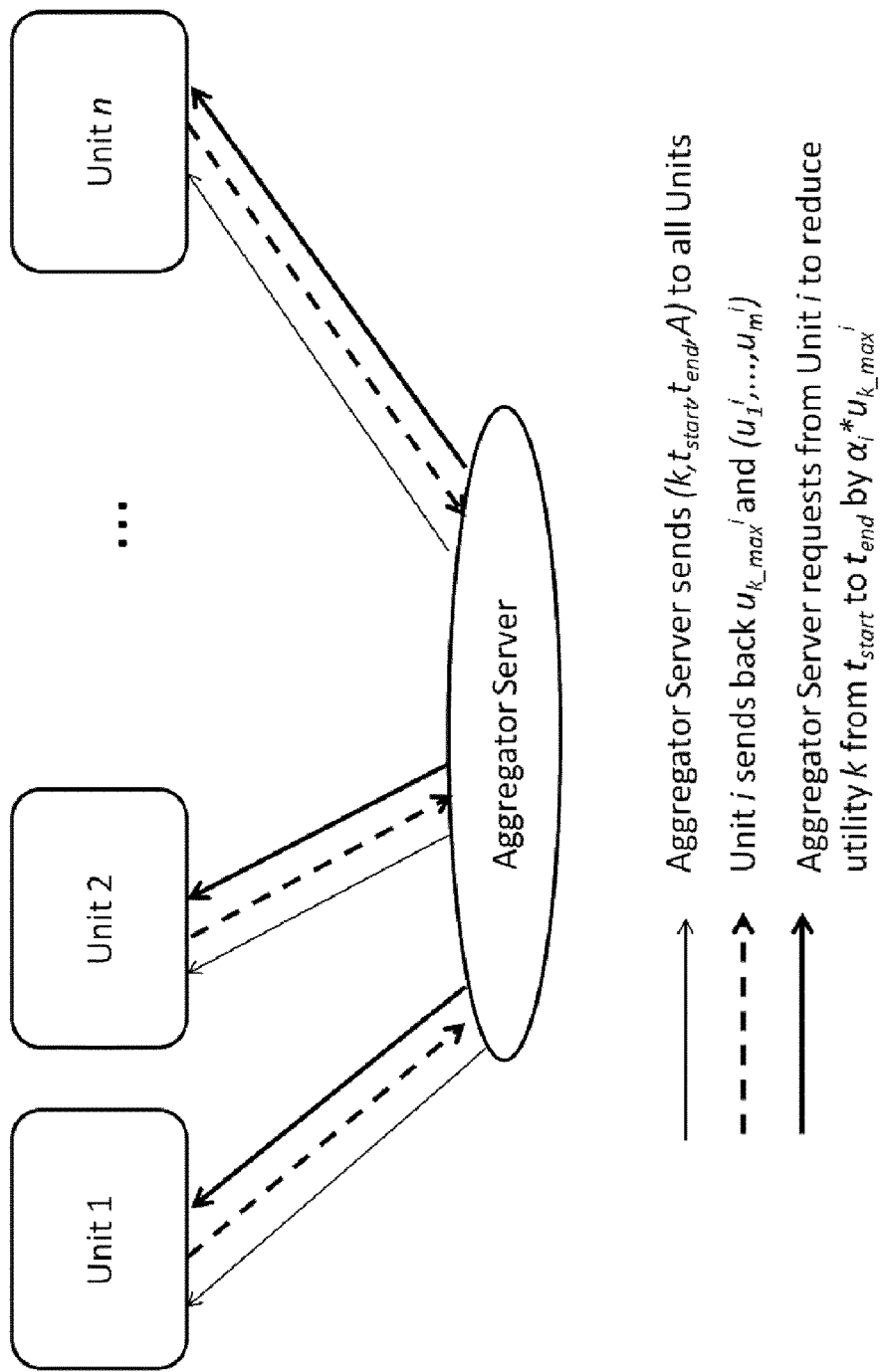
FIG. 4 shows schematically a possible communication between an aggregator server and units according to an embodiment of the invention.

The communication process happening between the aggregator and units is shown in FIG. 4 step by step. In the first step, the aggregator sends to all units the specifications of the aggregated DR request that has just arrived. These specifications include the utility that needs to be reduced—k—, the time period over which the reduction is requested—given through $t_{start}$ and $t_{end}$—and the desired reduction amount A. Each unit i sends back their maximal possible reductions of the utility k ($u_{k\_maxi}$) and an estimation of the impact of this reduction on all other utilities, given as $u_1^i, \ldots, u_m^i$. In the last step, the aggregator sends to each unit i, its allocated reduction amount $\alpha_i * u_{k\_max}^i$ where $\alpha_i \in (0,1)$.

In one preferred embodiment, we claim that each unit is connected to different controllable systems relating to the different utilities. Each unit's control module interacts with the aggregator and retrieves the management information [ctrl ($\alpha_i * u_{k\_max}^i$)] in DELEGATE ENFORCED mode, and will actuate [act ($\alpha_i * u_{k\_max}^i$)] the controllable systems directly through communication protocols defined in the state of the art or indirectly through intermediate interconnected systems.

Figure 3:
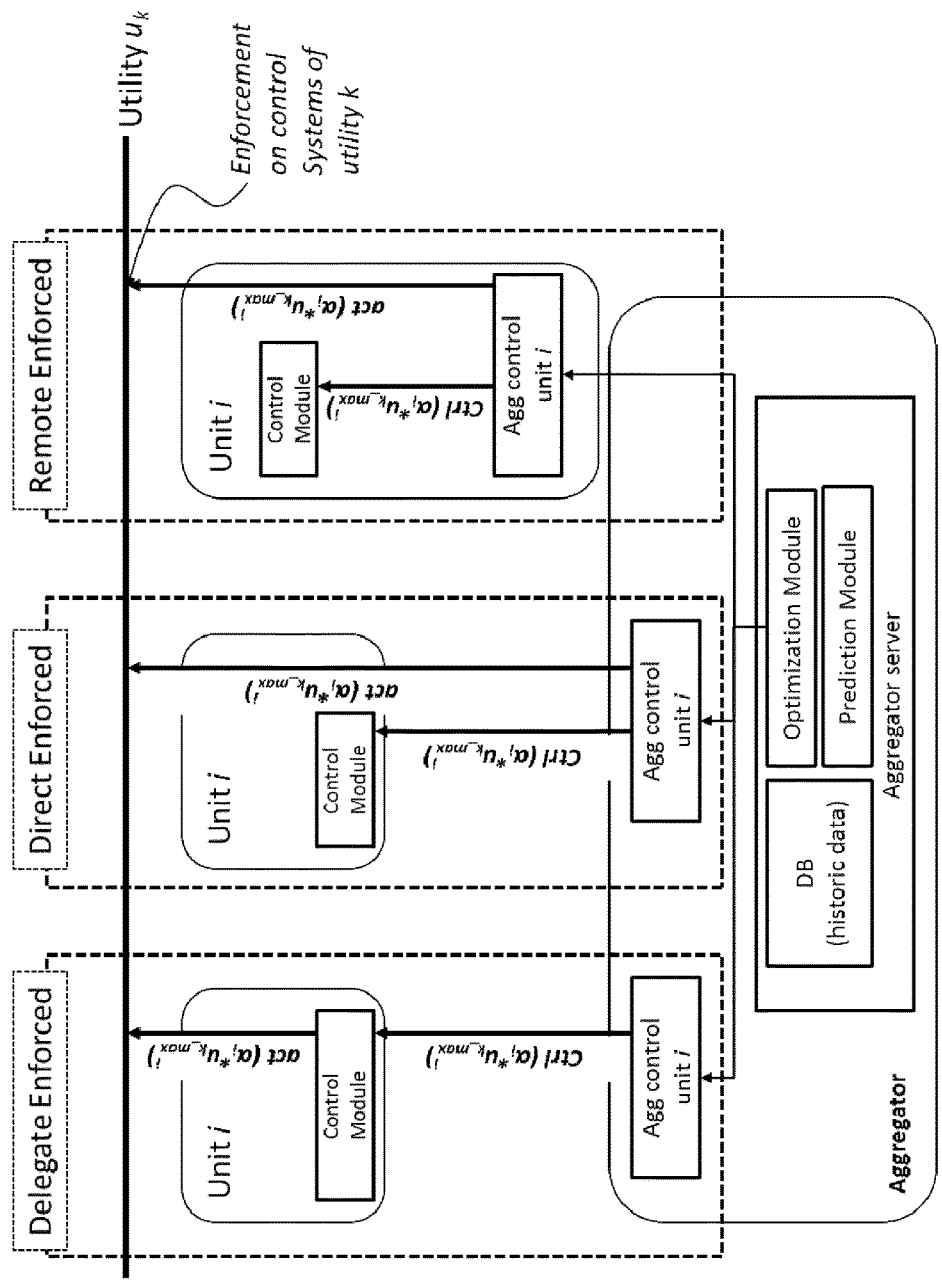
FIG. 3 shows schematically an actuation enforcement of aggregator's optimization decision in different enforcement embodiments.

In another preferred embodiment, the controllable systems are connected directly to the aggregator, i.e. the aggregator is granted control of the controllable systems through communication protocols defined in the state of the art. For this embodiment, the aggregator control unit might send the management information [ctrl ($\alpha_i * u_{k\_max}^i$)] to the unit's control module for information of actuation—or might be skipped—, however actuates directly via [act ($\alpha_i * u_{k\_max}^i$)] the controllable systems in either DIRECT ENFORCED mode—from aggregator server—or through the aggregator control unit remotely hosted at the unit's site in REMOTE ENFORCED, see FIG. 3 for details.

In a variation of the invention, the units can initiate communication with the aggregator, informing the aggregator of an additional or a reduced need of e.g. energy over a specified time horizon—this information may stem from past energy usage statistics, energy forecasts etc. This information the aggregator then uses to request appropriate energy modifications to other units connected to the aggregator as claimed in this invention.

If there are n large-scale buildings $B_1, \ldots, B_n$ participating in a m—utility DR program and being coordinated by the same aggregator, after receiving a signal for reduction of utility k during the period ($t_{start}, t_{end}$) by the amount of Requested, the aggregator enquires about each building's maximal possible reduction—denoted as $u_{k\_max}^i$ for the building i—and the resulting cost of this reduction on other utilities $u_1^i, \ldots, u_m^i$. The resulting cost $u_j^i$ is an estimation of the building i, how much the reduction of the utility k by $u_{k\_max}^i$ would affect the utility j. The value of $u_j^i$ can be both positive and negative, depending on the implications caused by a reduction in utility k. If a decrease in the utility k leads to an increase in the utility j, the value would be positive. But the other way around is also possible, if the utilities k and j are combined together as an input of a process that can be replaced by a third utility.

In the next step, the aggregator needs to predict future DR events based on historic data and possibly, a weather forecast. This prediction is restricted only to the period of time during which utilities would be affected due to the reduction in the utility k over the period ($t_{start}, t_{end}$) Besides probable events, the aggregator should predict their probabilities as well. For this type of prediction, Bayesian networks can be used. In this way, the set of highly probable events and their probabilities is obtained (E={($e_1,p_1$), ... ($e_j,p_j$)}). A certain threshold $p_{border}$ can be used to consider events with probability higher than $p_{border}$ as highly probably. Let's denote as H the set of all utility indices h such that the probability $p_h$ of the event $e_h$ requesting a decrease in the utility h is at least $p_{border}$.

In this stage, in order to allocate reductions in utility k to the buildings, the aggregator needs to solve the optimization problem described below. The control variables are $\alpha_1, \ldots \alpha_n$ which represent fractions of the maximal possible reductions $u_{k\_max}^1, \ldots, u_{k\_max}^n$ that will be requested from the buildings $B_1, \ldots, B_n$, respectively. Any of standard optimization methods, such as genetic algorithms or simulated annealing, can be used to solve the problem. Since for this specific embodiment, the problem formulation is linear, linear programming can be used to solve it.

An Objective function can be expressed as:

$$\min \Sigma_{\square \in H}(w_\square * \Sigma_{i=1}^n \alpha_i * u_\square^i).$$

The objective is to minimize the impact of the requested reductions on the utilities for which there is a high probability that their reduction will be requested in near future (h ∈ H). $w_h$ is a weight factor used to give different importance to different utilities. The weight factors should be selected depending on the specific application case, but one option is to use the event probabilities $p_h$ as a measure of their relative importance. The cost for the utility h is estimated as $\Sigma_{i=1}^n \alpha_i * u_h^i$ where $\alpha_i$ is a control variable—determining the amount of reduction $\alpha_i * u_{k\_max}^i$ to be requested from the building $B_i$—and $u_h^i$ is the cost in the utility $u_h$ for the reduction $u_{k\_max}^i$ of the utility k in the building $B_i$. This function makes an estimation of the costs assuming that the cost in the utility i scales linearly with the reduction of the utility k.

The entire desired amount of reduction should be allocated according to:

$$|\Sigma_{i=1}^n \alpha_i * u_{k\_max}^i - \text{Requested}| \leq AD$$

where AD represents the allowed deviation from the requested amount of reduction. Another possible approach that would behave better in the case that the required reduction is not achievable, would be to add this absolute value to the objective function with its weight factor. The approach using the constraint would require rerunning the problem for a lower requested value in the case that the problem is not feasible.

There are two more groups of constraints that require control variables to be from the range [0,1]:
1.) For all i: $\alpha_i \geq 0$
2.) For all i: $\alpha_i \leq 1$ Once the problem is solved, the units responsible for each building $B_i$ are informed about the requested reduction of $\alpha_i * u_{k\_max}^i$ and control the Building Management System accordingly. In a variation of this embodiment, the aggregator is—after having solved the optimization problem—allowed to directly control the Building Management System and thus the information of the reduction requests for each individual unit can be skipped.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling supply of different utilities to different units, wherein each unit is connected to the different utilities, the method comprising:
   receiving, by an aggregator, a demand request signal from at least one operational entity and/or from at least one of the different utilities for requesting a demand modification of a first utility of the different utilities, the different utilities comprising at least an electrical utility for supplying electricity to the different units and at least one of a gas utility for supplying gas to the different units and a water utility for supplying water to the different units;
   performing, by the aggregator, an allocation of the requested demand modification to the different units based on a negotiating process with the different units for minimizing an impact of the allocation on a future operation of at least one other utility of the different utilities, the negotiating process including receiving feedback information from at least one unit in the different units, the feedback information comprising an estimation of a maximal possible modification of the first utility over a requested time period and an estimation of how the maximal possible modification of the first utility over the requested time period would affect loads of the at least one other utility connected to the at least one unit, the modification being a reduction or an increase;
   determining a probability that the at least one other utility will issue a demand request signal for requesting a demand modification of the at least one other utility in a time period during which the at least one other utility would be affected by the maximal possible modification of the first utility;
   providing the allocation of the requested demand modification to the different units based on the feedback information and the probability that the at least one other utility will issue a demand request signal.

2. The method according to claim 1, wherein the allocation is performed dynamically.

3. The method according to claim 2, wherein the allocation is performed in real-time.

4. The method according to claim 1, wherein the probability depends on one or more of weather, time, season, activity and historical data.

5. The method according to claim 4, wherein the probability depends at least in part on the historical data which comprises prior allocation processes per unit including amount, timeline and/or duration of prior allocated demand modifications.

6. The method according to claim 1, wherein the estimation of how the maximal possible modification of the first utility over the requested time period would affect loads of the at least one other utility connected to the at least one unit is based on a unit-specific correlation in size, amount and/or response time between the different utilities which has been learned for at least one of the different units.

7. The method according to claim 1, wherein the negotiating process considers an operation-specific priority level and/or a Key Performance Indicator requirement on a comfort level and/or scheduled operational conditions for activities or events.

8. The method according to claim 1, wherein the aggregator directly controls the utility distribution systems of the different units according to the allocated demand modification.

9. The method according to claim 1, wherein at least one of the different units is a building and/or wherein the at least one operational entity is an energy planning entity or a unit.

10. The method according to claim 1, wherein the first utility is the electrical utility and the at least one other utility is the gas utility and/or the water utility.

11. The method according to claim 1, wherein the first utility is the water utility and the at least one other utility is the electrical utility.

12. The method according to claim 1, wherein the first utility is the water utility and the at least one other utility is the gas utility.

13. The method according to claim 1, wherein the first utility is the gas utility and the at least one other utility is the electrical utility and/or the water utility.

14. A system for controlling supply of different utilities to different units, wherein each unit is connected to the different utilities and wherein a demand request signal is provided by at least one operational entity and/or by at least one of the different utilities for requesting a demand modification of a first utility of the different utilities, the different utilities comprising at least an electrical utility for supplying electricity to the different units and at least one of a gas utility for supplying gas to the different units and a water utility for supplying water to the different units, the system comprising:
an aggregator for:
receiving the demand request signal,
performing an allocation of the requested demand modification to the different units based on a negotiating process with the different units for minimizing an impact of the allocation on a future operation of at least one other utility of the multiple utilities, wherein the negotiating process includes receiving feedback information from at least one unit in the different units, the feedback information comprising an estimation of a maximal possible modification of the first utility over a requested time period and an estimation of how the maximal possible modification of the first utility over the requested time period would affect loads of the at least one other utility connected to the at least one unit, the modification being a reduction or an increase,
determining a probability that the at least one other utility will issue a demand request signal for requesting a demand modification of the at least one other utility in a time period during which the at least one other utility would be affected by the maximal possible modification of the first utility, and
providing the allocation of the requested demand modification to the different units based on the feedback information and the probability that the at least one other utility will issue a demand request signal.

* * * * *